United States Patent [19]
Nakamura et al.

[11] Patent Number: 5,852,677
[45] Date of Patent: Dec. 22, 1998

[54] IMAGE DATA PROCESSING APPARATUS

[75] Inventors: Koji Nakamura; Masayuki Mizuno, both of Osaka, Japan

[73] Assignee: Mita Industrial Co., Ltd, Osaka, Japan

[21] Appl. No.: 802,778

[22] Filed: Feb. 18, 1997

[30] Foreign Application Priority Data

Feb. 19, 1996 [JP] Japan .................................. 8-031032

[51] Int. Cl.$^6$ .............................. G06K 9/34; G06T 5/00; H04N 1/403
[52] U.S. Cl. ......................... 382/173; 382/176; 382/254; 358/462; 358/464; 358/465
[58] Field of Search .................................... 382/270, 273, 382/170, 173, 172, 171, 176; 358/462, 466, 464, 465

[56] References Cited

U.S. PATENT DOCUMENTS

| | | | |
|---|---|---|---|
| 4,972,501 | 11/1990 | Horyu | 382/273 |
| 5,280,546 | 1/1994 | Mahida et al. | 358/451 |

*Primary Examiner*—Scott Rogers
*Assistant Examiner*—Joe Q. Davis, Jr.
*Attorney, Agent, or Firm*—Rabin & Champagne P.C.

[57] ABSTRACT

An image data processing apparatus is provided which is capable of properly reproducing an input image by performing a simple and short-time process in accordance with the density and type of the input image. If the minimum value of inputted image data is not higher than a first threshold, the minimum value of the inputted image data is adopted as a minimum input value to be inputted to an image outputting apparatus. If the minimum value of the inputted image data is higher than the first threshold, a lower limit input image data value is adopted as the minimum input value. Further, if the maximum value of the inputted image data is not lower than a second threshold which is higher than the first threshold, the maximum value of the inputted image data is adopted as a maximum input value to be inputted to the image outputting apparatus. If the maximum value of the inputted image data is lower than the second threshold, an upper limit input image data value is adopted as the maximum input value. Thus, the inputted image is corrected so that inputted image data within a range between the minimum input value and the maximum input value correspond to data within a range between a lower limit value and an upper limit value for input to the image outputting apparatus.

11 Claims, 5 Drawing Sheets

IMAGE DATA PROCESSING APPARATUS

BACKGROUND OF THE INVENTION

1. Field of the Invention

The present invention relates to an image data processing apparatus which is applied to an image forming apparatus such as a digital copying machine and is capable of processing image data in accordance with the density and type of an image for proper reproduction of the image.

2. Description of Related Art

Digital copying machines have been available which are adapted to read an original image in a scanner section including an image sensor, then process image data outputted from the scanner section in an image data processing circuit and reproduce the original image in a printing section on the basis of the processed image data. The scanner section has a light source for illuminating a document original, a conveyer mechanism for moving the light source along the document original, and an optical system for guiding light reflected from the document original to the image sensor.

Since the density of the document original to be copied is not even, a light exposure adjusting process should be performed in a copying machine. Although an analog copying machine achieves the exposure adjustment by adjusting the luminance of the light source, the digital copying machine in which the luminance of the light source is constant cannot perform the exposure adjusting process by changing the luminance of the light source. This is because the image processing circuit of the digital copying machine is designed on the precondition that the document original is illuminated with light from a light source of a constant luminance.

In the digital copying machine, the light exposure adjusting process is typically achieved by a digital data processing. That is, the image data are properly corrected in accordance with the density of the document original to provide a copy having an appropriate density distribution.

More specifically, the scanner section outputs image data of 8 bits on a 256-level gradation scale, for example. Then, the numbers of pixels having the respective gradation levels ranging from 0 to 255 are determined to prepare a histogram. The analysis of the histogram determines the density range of the document original image. To provide a copy with an excellent density reproducibility, the image data are properly corrected so that the density range of the original image correspond to the entire range of output gradation levels for the printing section. Thus, the digital data processing achieves the light exposure adjustment equivalent to that achieved by adjusting the luminance of the light source.

However, the preparation and analysis of the histogram for the prior-art light exposure adjusting process require a complicated arithmetic operation and a long processing time. Particularly where the light exposure adjusting process is to be performed in an optimal way on a document original including different types of images such as a character image and a photographic image, a further complicated process is required, resulting in a longer processing time.

SUMMARY OF THE INVENTION

It is an object of the present invention to provide an image data processing apparatus which is capable of properly reproducing an input image by performing a simple and short-time process in accordance with the density and type of the input image.

It is another object of the present invention to provide an image data processing process for processing an input image in a simple and short-time manner in accordance with the density and type of the input image for proper reproduction of the input image.

It is further another object of the present invention to provide an image outputting apparatus which is capable of properly reproducing an input image by performing a simple and short-time process in accordance with the density and type of the input image.

The image data processing apparatus of the present invention is adapted to produce image data to be applied to image outputting means which is capable of producing pixels of a plurality of density gradation levels on the basis of inputted image data within a range between a lower limit value and an upper limit value. In the apparatus, the minimum value of the inputted image data is compared with a first threshold which is higher than a lower limit input image data value and lower than an upper limit input image data value. The maximum value of the inputted image data is compared with a second threshold which is higher than the first threshold and lower than the upper limit input image data value. If the minimum value of the inputted image data is not higher than the first threshold, the minimum value of the inputted image data is adopted as a minimum input value, and if the minimum value of the inputted image data is higher than the first threshold, the lower limit input image data value is adopted as the minimum input value. Further, if the maximum value of the inputted image data is not lower than the second threshold, the maximum value of the inputted image data is adopted as a maximum input value, and if the maximum value of the inputted image data is lower than the second threshold, the upper limit input image data value is adopted as the maximum input value. For preparation of image data to be applied to the image outputting means, the inputted image data are corrected so that inputted image data within a range between the minimum input value and the maximum input value correspond to data within the range between the lower limit value and the upper limit value for input to the image outputting means.

Where image data of a document original having a relatively high density background are inputted, for example, the minimum value of the inputted image data is higher than the lower limit input image data value. In such a case, if the first threshold is properly set, the minimum value of the inputted image data is adopted as the minimum input value. As a result, the minimum value of the inputted image data is allowed to correspond to the lower limit value for input to the image outputting means. Thus, inputted image data corresponding to the background portion are omitted so that the output dynamic range of the image outputting means can effectively be utilized.

Where image data of a document original having a relatively low density level even in its higher density portion are inputted, the maximum value of the inputted image data is lower than the upper limit input image data value. In such a case, if the second threshold is properly set, the maximum value of the inputted image data is adopted as the maximum input value. As a result, the maximum value of the inputted image data is allowed to correspond to the upper limit value for input to the image outputting means. Thus, the density level of the higher density portion can be raised so that the output dynamic range of the image outputting means can effectively be utilized.

Where image data obtained by scan-reading a character document original are inputted, the density level of a background portion of the document original corresponds to the minimum value of the inputted image data. In such a case, if the first threshold is properly set, the minimum value of the inputted image data is not higher than the first threshold. Thus, the minimum value of the inputted image data is adopted as the minimum input value, which is allowed to correspond to the lower limit value for input to the image outputting means. As a result, inputted image data corresponding to the background portion are omitted. Even if the document original does not have a pure white background like newspaper, for example, the character image can be properly reproduced.

Further, the density level of a character portion in the image data obtained by scan-reading the character document original corresponds to the maximum value of the inputted image data. If the second threshold is properly set, the maximum value of the inputted image data is not lower than the second threshold. Thus, the maximum value of the inputted image data is adopted as the maximum input value, which is allowed to correspond to the upper limit value for input to the image outputting means. As a result, the density of the character portion is further enhanced so that the character image can be properly reproduced.

A gray-scale image such as a photographic image or a dotted image does not have a background portion nor an extremely high density portion. Therefore, where image data obtained by scan-reading a document original bearing such a gray-scale image are inputted, if the first and second thresholds are properly set, the minimum value of the inputted image data is higher than the first threshold and the maximum value of the inputted image data is lower than the second threshold. As a result, the upper limit input image data value and the lower limit input image data value are adopted as the maximum input value and the minimum input value, respectively, which are allowed to correspond to the upper limit value and the lower limit value, respectively, for input to the image outputting means. Since the gray-scale image undergoes neither the omission of the background portion nor the enhancement of the high density portion, the gray-scale image having a moderate gradation can properly be reproduced.

The maximum and minimum values of the inputted image data are compared with the first and second thresholds, respectively, and the minimum input value and the maximum input value are properly determined, on the basis of the comparison result, such that inputted image data within the range between the minimum input value and the maximum input value are allowed to correspond to the data within the range between the lower limit value and the upper limit value for input to the image outputting means. With such a simple process, the aforesaid effects can be ensured. Thus, the image data processing can properly be performed in accordance with the density and type of the image in a short time.

The foregoing and other objects, features and effects of the present invention will become apparent from the following description of the preferred embodiments with reference to the attached drawings.

DESCRIPTION OF THE PREFERRED EMBODIMENTS

Figure 1:
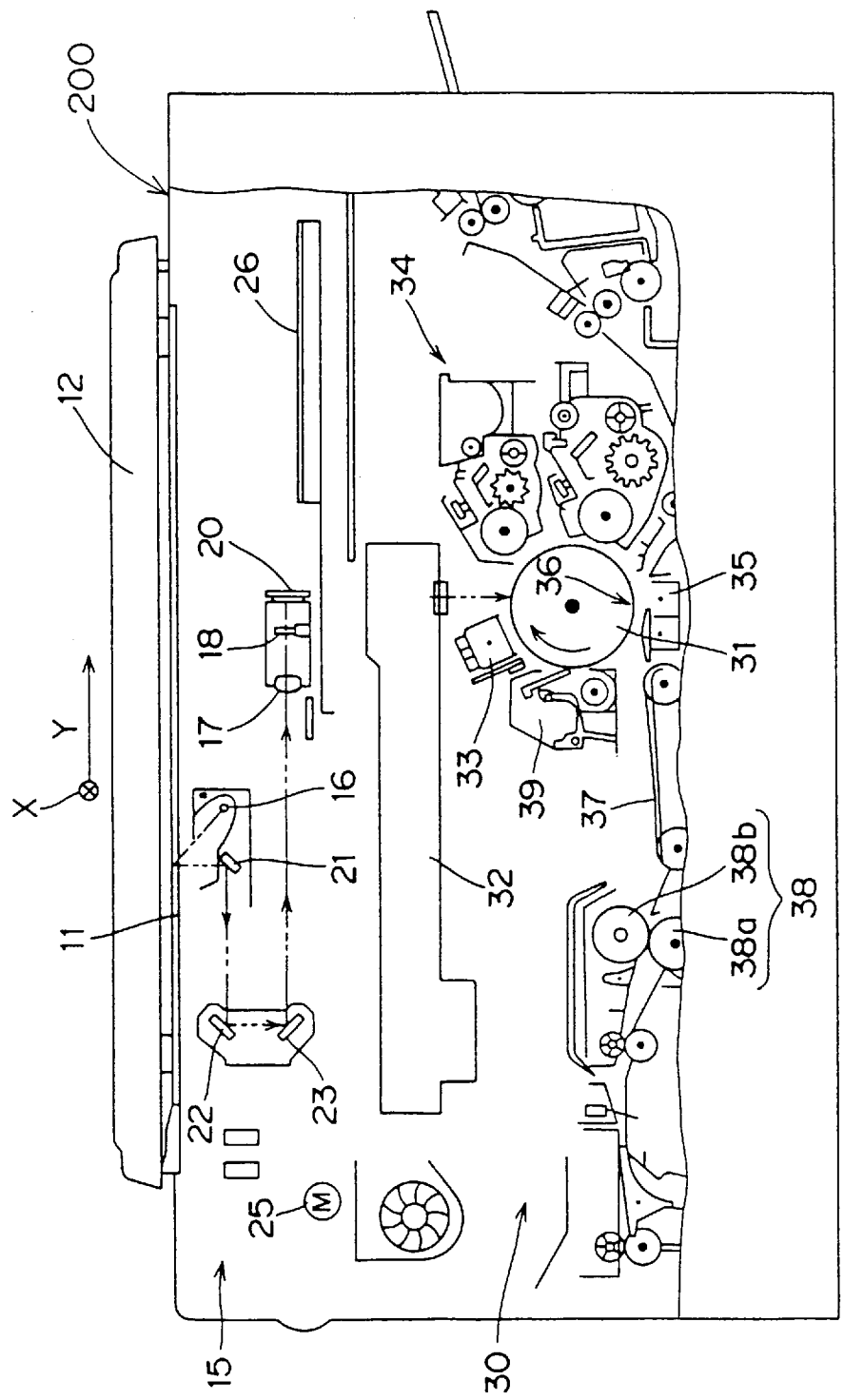
FIG. 1 is a sectional view illustrating the internal construction of a digital copying machine to which one embodiment of the present invention is applied.

FIG. 1 is a sectional view illustrating the internal construction of a digital copying machine to which one preferred embodiment of the present invention is applied. On the top face of a copying machine body 200 is provided a transparent document platen 11 on which a document original is to be placed. A document platen cover 12 is openably provided in association with the document platen 11. Below the document platen 11 is provided a scanner section 15 for reading a document original image. Below the scanner section 15 is provided a printing section 30 serving as image outputting means for reproducing the document original image on a recording sheet fed from a sheet feeding section not shown.

The scanner section 15 includes a light source 16 such as a halogen lamp for scanning the document original for illumination thereof. The light source 16 is adapted to generate light of a constant luminance. The light generated by the light source 16 is reflected horizontally by a first reflection mirror 21 movable along with the light source 16. The light from the reflection mirror 21 is reflected by second and third reflection mirrors 22 and 23 along a U-turn light path and enters a linear CCD sensor 20 through a lens 17 and a moire filter 18. The light source 16 and the first reflection mirror 21 are moved along the document platen 11. The second and third reflection mirrors 22 and 23 are moved along the document platen 11 at a speed half the traveling speed of the light source 16. The light source 16 and the first to third reflection mirrors 21, 22 and 23 are driven by an optical motor 25.

The linear CCD sensor 20 outputs image signals indicative of an optical image of the document original formed on a light receiving surface thereof. The image signals are inputted to a reading control board 26. The reading control board 26 includes an image processing circuit (see FIG. 2) for processing the image signals and a reading control circuit for controlling the optical motor 25 and the light source 16.

The reading of the document original is achieved by a combination of primary scanning to be electrically performed by the linear CCD sensor 20 and secondary scanning to be performed by moving the light source 16 in a secondary scanning direction Y with respect to the document original. The CCD sensor 20 has a plurality of detection elements linearly arranged in a primary scanning direction X (a direction perpendicular to the face of FIG. 1). The image of the document original on the document platen 11 is read on a pixel-by-pixel basis in which each fine pixel corresponds to a detection element. The CCD sensor 20 outputs an image signal indicative of the density of each pixel.

The printing section 30 is adapted to form an image on a recording sheet on the basis of an electrophotographic process. More specifically, the printing section 30 includes a photoreceptor drum 31 and a laser exposure unit 32 for selectively exposing the surface of the photoreceptor 31 to light. The laser exposure unit 32 generates a laser beam modulated on the basis of an image to be recorded. Before the exposure by the laser exposure unit 32, the surface of the photoreceptor 31 is uniformly charged by a main charger 33. Therefore, by the selective exposure to the laser beam, an electrostatic latent image corresponding to the image to be recorded is formed on the surface of the photoreceptor 31. The electrostatic latent image is developed into a toner image by a developing unit 34. The toner image is transferred onto a recording sheet transported to a transfer region 36 by an operation of the transfer charger 35. The recording sheet bearing the toner image transferred thereon is guided to a fixing unit 38 by a conveyer belt 37. In the fixing unit 38, toner particles are fixed on the recording sheet by heat and press between a pair of rollers 38a and 38b thereof. After the toner image is transferred onto the recording sheet, the surface of the photoreceptor 31 is cleaned by a cleaning unit 39 for removal of residual toner.

Figure 2:
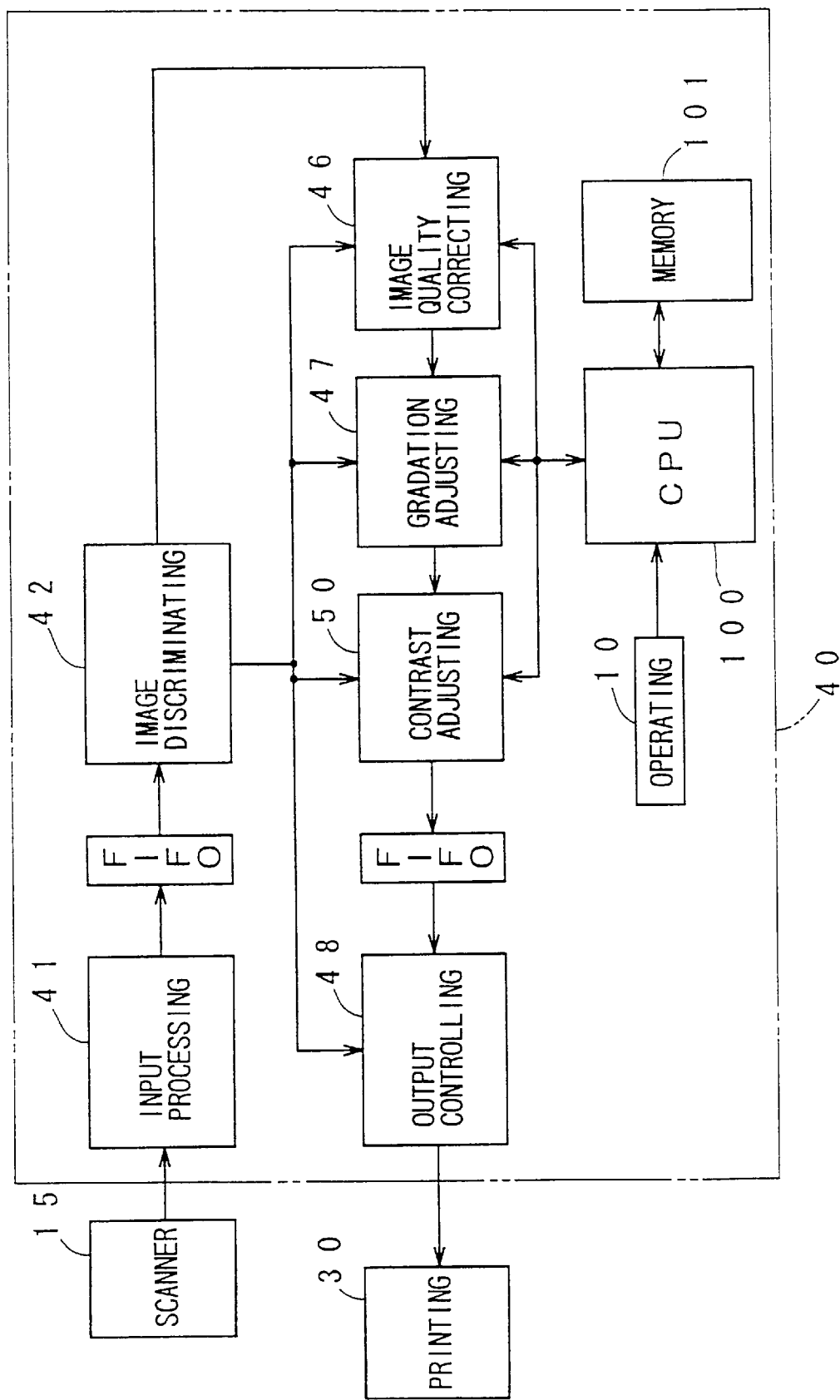
FIG. 2 is a block diagram for explaining the electrical construction of an image processing circuit.

FIG. 2 is a block diagram illustrating the basic construction of the image processing circuit 40 for processing data outputted from the scanner section 15 to produce image data to be applied to the printing section 30. The output data of the scanner section 15 are data of 8 bits indicative of the densities of the respective pixels on a 256-level gradation scale, for example. The data are inputted to an input processing circuit 41, which deletes image data corresponding to the margin of the document original to prevent the formation of an image on the margin of the recording sheet and adjusts an image formation position on the recording sheet.

Data outputted from the input processing circuit 41 are applied to an image discrimination circuit 42 via a FIFO (first-in first-out memory). The image discrimination circuit 42 judges which image area, among a character image area, a photographic image area and a dotted image area, the respective pixels belong to. The judgment result is applied to an image quality correcting section 46, a gradation adjusting section 47, a contrast adjusting section 50 and an output controlling circuit 48, and used for performing an appropriate process depending on the types of image areas to which the respective pixels belong.

The functions of the image quality correcting section 46, the gradation adjusting section 47 and the contrast adjusting section 50 may be each performed by a software process implemented by a CPU 100. For example, the image quality correcting section 46 subjects the inputted image data to an outline emphasis process for enhancing the clarity of the image, a softening process for reducing the stiffness of the image, and a like process. The gradation adjusting section 47 performs an exposure adjustment process for modifying the image data in accordance with the density and type of the document original image. Further, the contrast adjusting circuit 50 functions to change the contrast of the image by modifying the image data.

The image data processed by the contrast adjusting section 50 are applied to the output controlling circuit 48. The output controlling circuit 48 generates a laser oscillation signal which is to be applied to the laser exposure unit 32 (see FIG. 1).

Operations of the respective components of the image processing circuit 40 are comprehensively controlled by the CPU 100. The CPU 100 receives signals inputted from an operating section 10 provided on the upper face of the copying machine body 200 (see FIG. 1). Further, the CPU 100 is connected to a memory 101.

Figure 3:
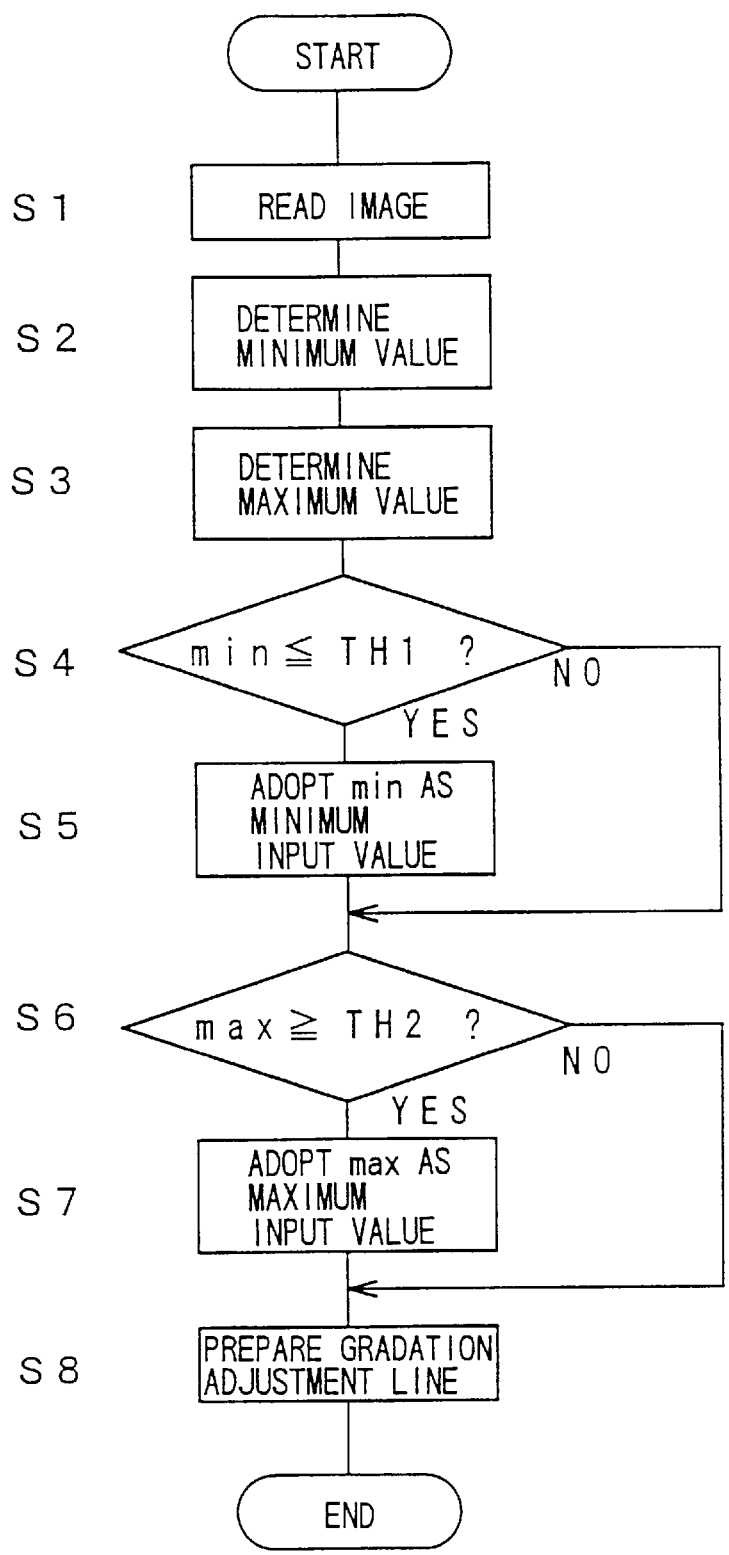
FIG. 3 is a flow chart for explaining the flow of a process to be performed by a gradation adjusting section.

FIG. 3 is a flow chart for explaining the operation of the gradation adjusting section 47. The operation of the gradation adjusting section 47 may be performed by a software process implemented by the CPU 100 on the basis of predetermined programs stored in the memory 101.

After a document original is read by the scanning section 15 (Step S1), the minimum value min and the maximum value max of image data outputted from the scanner section 15 (more precisely, image data outputted from the image discrimination circuit 42) are determined (Steps S2 and S3). The minimum value min is compared with a first threshold TH1 which is preliminarily set at a value between a lower limit input value "0" and an upper limit input value "225" (Step S4). If the minimum value min is not higher than the first threshold TH1, the minimum value min is adopted as a minimum input value (Step S5). If the minimum value min is higher than the first threshold TH1, Step S5 is skipped. More specifically, the lower limit input value "0" is adopted as the minimum input value.

On the other hand, the maximum value max is compared with a predetermined second threshold TH2 which is higher than the first threshold TH1 and lower than the upper limit input value "225" (Step S6). If the maximum value max is not lower than the second threshold TH2, the maximum value max is adopted as a maximum input value (Step S7). If the maximum value max is lower than the second threshold TH2, Step S7 is skipped. More specifically, the upper limit input value "225" is adopted as the maximum input value.

In turn, inputted image data within a rang between the minimum input value and the maximum input value thus determined are allowed to correspond to output image data within a range between a lower limit output value "0" and an upper limit output value "225", and a gradation adjustment line is prepared (Step S8). More specifically, the CPU 100 produces a table corresponding to the gradation adjustment line in a storage area of the memory 101. The image data processed by the image quality correcting section 46 are corrected on the basis of the gradation adjustment line.

FIGS. 4 to 7 are graphical representations illustrating exemplary gradation adjustment lines.

Figure 4:
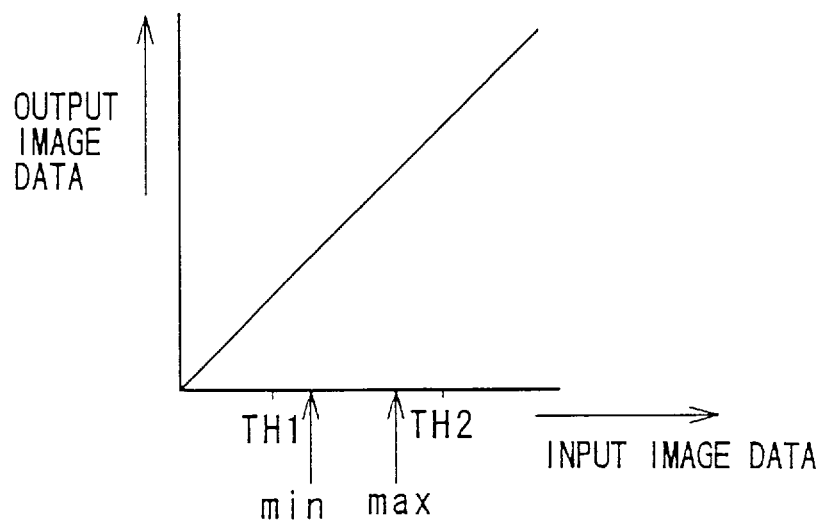
FIGS. 4 to 7 are graphical representations illustrating exemplary gradation adjustment lines.

FIG. 4 shows a gradation adjustment line to be prepared where the minimum value min is higher than the first threshold TH1 and the maximum value max is lower than the second threshold TH2. In accordance with this gradation adjustment line, output image data within a range between 0 and 255 which are directly proportional to the inputted image data within a range between 0 and 255 are outputted.

Figure 5:
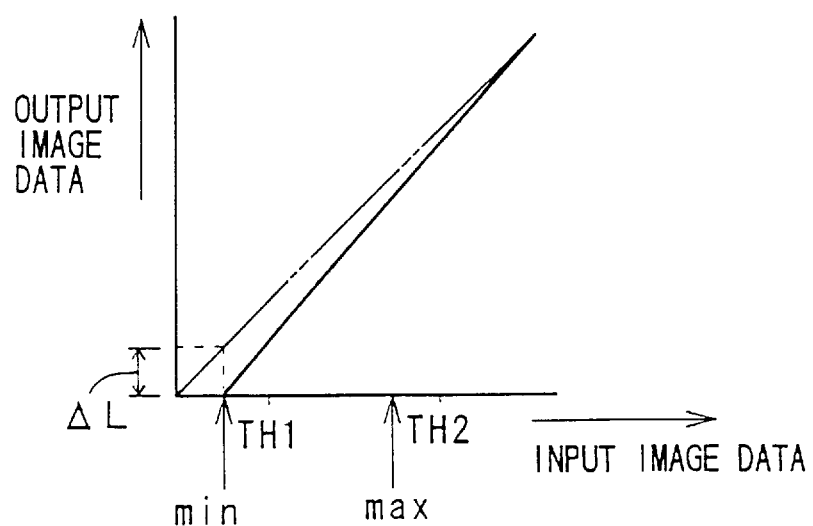

FIG. 5 shows a gradation adjustment line to be prepared where the minimum value min is lower than the first threshold TH1 and the maximum value max is lower than the second threshold TH2. The inputted image data are processed on the basis of this gradation adjustment line, whereby inputted image data within a range between min and 255 are allowed to correspond in a linear relation to output image data within a range between 0 and 255. Inputted image data in a range below the minimum value min are omitted, whereby the dynamic range is increased by a degree ΔL in comparison with the case where the gradation adjustment line shown in FIG. 4 (or shown by a two-dot-dashed line in FIG. 5) is employed. Thus, an image having a high contrast can be formed, for example, with the color of the background portion of the document original not reproduced, so that the same effect as obtained by increasing the exposure amount can be achieved.

Figure 6:
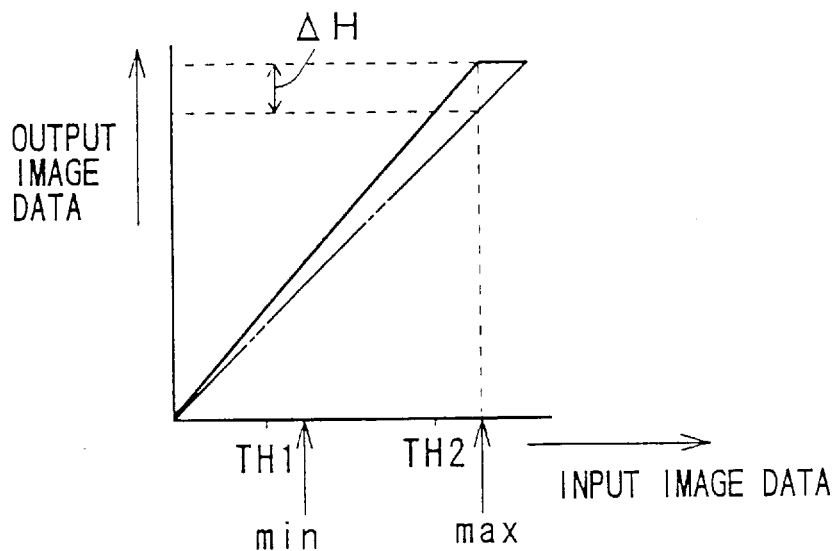

FIG. 6 shows a gradation adjustment line to be prepared where the minimum value min is higher than the first threshold TH1 and the maximum value max is higher than the second threshold TH2. The inputted image data are processed on the basis of this gradation adjustment line, whereby inputted image data within a range between 0 and max are allowed to correspond in a linear relation to output image data within a range between 0 and 225. Inputted image data in a range above the maximum value max are omitted, whereby the dynamic range is increased by a degree ΔH in comparison with the case where the gradation adjustment line shown in FIG. 4 (or shown by a two-dot-dashed line in FIG. 6) is employed. Thus, even a high density portion of a generally bright document original image can be properly reproduced. That is, the same effect as obtained by reducing the exposure amount can be achieved.

Figure 7:
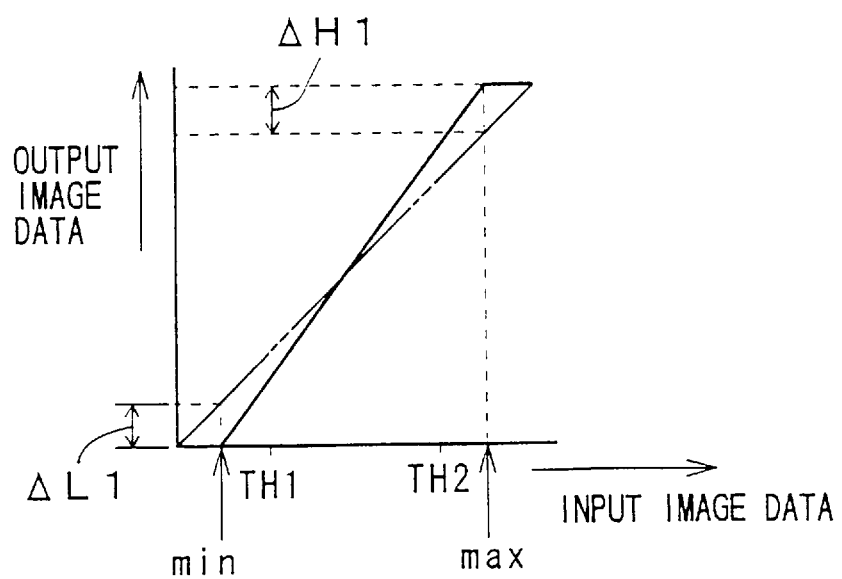

FIG. 7 shows a gradation adjustment line to be prepared where the minimum value min is lower than the first threshold TH1 and the maximum value max is higher than the second threshold TH2. The inputted image data are processed on the basis of this gradation adjustment line, whereby inputted data in ranges below the minimum value min and above the maximum value max are omitted. Therefore, the output dynamic range is increased by a degree ΔL1 in a lower density region and by a degree ΔH1 in a higher density region. Thus, a copy image having an excellent gradation can be formed.

In accordance with this embodiment, either the minimum value min of the inputted image data or "0" is adopted as the minimum input value for the gradation adjustment on the basis of the comparison of the minimum value min of the inputted image data with the first threshold TH1. Either the maximum value max of the inputted image data or "225" is adopted as the maximum input value for the gradation adjustment on the basis of the comparison of the maximum value max of the inputted image data with the second threshold TH2.

Where the document original has a relatively high density background portion like a newspaper, the minimum value of the inputted image data is higher than "0" and lower than the first threshold TH1. In such a case, image data are corrected on the basis of the gradation adjustment line shown in FIG. 5. As a result, inputted image data corresponding to the background portion can be omitted with the same effect as achieved by increasing the exposure amount and, in addition, the entire output dynamic range of the printing section 30 can effectively be utilized for proper reproduction of the original image.

Where the document original has a relatively low density level even in its higher density portion, the maximum value of the inputted image data is lower than "225" and higher than the second threshold TH2. In such a case, the image data are corrected on the basis of the gradation adjustment line shown in FIG. 6. As a result, the density level of the higher density portion can be raised like a case where the exposure amount is reduced and, in addition, the entire output dynamic range of the printing section 30 can effectively be utilized for proper reproduction of the original image.

Where the document original is a character document original, for example, the minimum value of the inputted image data corresponding to the background portion of the document original is not higher than the first threshold TH1 and the maximum value of the inputted image data corresponding to the character portion of the document original is not lower than the second threshold TH2. In such a case, the inputted image data is corrected on the basis of the gradation adjustment line shown in FIG. 7. As a result, inputted image data corresponding to the background portion can be omitted and, in addition, the density of the character portion can be increased. Therefore, an excellent copy image can be formed.

A gray-scale image such as a photographic image or a dotted image has no background portion. Therefore, the minimum value of the inputted image data is not so low and the maximum value of the inputted image data is not so high. Therefore, the gradation adjustment line shown in FIG. 4 is employed for the copying of the gray-scale image. Since neither the low density gradation portion nor the high density gradation portion is omitted, the gray-scale image having a moderate gradation can be properly reproduced.

The first threshold TH1 is preferably set at a value which is higher than a data value corresponding to the background portion of the character document original and lower than the minimum value of the image data of the gray-scale image. More specifically, where the density of each pixel is represented by image data of 8 bits on a 256-level gradation scale, the first threshold TH1 is preferably set at a value within a range of $40 \leq TH1 \leq 60$.

The second threshold TH2 is preferably set at a value which is lower than a data value corresponding to the character portion of the character document original and higher than the maximum value of the image data of the gray-scale image. More specifically, where the density of each pixel is represented by image data of 8 bits on a 256-level gradation scale, the second threshold TH2 is preferably set at a value with a range of $180 \leq TH2 \leq 200$.

While the embodiment of the present invention has thus been described, the invention is not limited to the aforesaid embodiment. Although the inputted image data within the range between the minimum input value and the maximum input value are allowed to correspond in a linear relation to the output image data within the range between the lower limit output value and the upper limit output value, the linear correspondence is not a critical requirement. For example, a generally S-shaped gradation adjustment curve may be employed in consideration of the characteristics of the photoreceptor and the toner.

The present invention is applied to a digital copying machine as one example in the aforesaid embodiment, but can also be applied to any image outputting apparatuses which are adapted to form an image on the basis of image data stored in storage media such as flexible disk or CD-ROM.

Although the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application is based on application No. 8-031032 filed in Japan, the content of which is incorporated hereinto by reference.

What is claimed is:

1. An image data processing apparatus adapted to produce image data to be applied to image outputting means which is capable of producing pixels of a plurality of density gradation levels on the basis of inputted image data having values within a range between a lower limit value and an upper limit value, the image data processing apparatus comprising:

first comparison means for comparing a minimum value of the inputted image data with a first threshold which is higher than a lower limit input value and lower than an upper limit input image data value;

second comparison means for comparing a maximum value of the inputted image data with a second threshold which is higher than the first threshold and lower than the upper limit input image data value;

minimum input value determining means for adopting the minimum value of the inputted image data as a minimum input value if the minimum value of the inputted image data is not higher than the first threshold, and adopting the lower limit input image data value as the minimum input value if the minimum value of the inputted image data is higher than the first threshold, on the basis of the comparison by the first comparison means;

maximum input value determining means for adopting the maximum value of the inputted image data as a maximum input value if the maximum value of the inputted image data is not lower than the second threshold, and adopting the upper limit input image data value as the maximum input value if the maximum value of the inputted image data is lower than the second threshold, on the basis of the comparison by the second comparison means; and data correction means for correcting the inputted image data so that inputted image data within a range between the minimum input value and the maximum input value thus determined correspond to data within a range between the lower limit value and the upper limit value for input to the image outputting means, to prepare image data to be applied to the image outputting means.

2. An image data processing apparatus as set forth in claim 1, wherein the first threshold is set at a value which is higher than a data value corresponding to a background portion of a character document original and lower than a minimum data value of a gray-scale image.

3. An image data processing apparatus as set forth in claim 1, wherein the second threshold is set at a value which is lower than a data value corresponding to a character portion of a character document original and higher than a maximum data value of a gray-scale image.

4. An image data processing apparatus as set forth in claim 1, wherein the image outputting means includes:
  a photoreceptor;
  exposure means for selectively exposing the photoreceptor to light to form an electrostatic latent image corresponding to the applied image data on a surface of the photoreceptor;
  a developing unit for developing the electrostatic latent image formed on the surface of the photoreceptor into a toner image; and
  transfer means for transferring the toner image onto a sheet.

5. An image data processing process for producing image data to be applied to image outputting means which is capable of producing pixels of a plurality of density gradation levels on the basis of inputted image data having values within a range between a lower limit value and an upper limit value, the image data processing process comprising the steps of:
  comparing a minimum value of the inputted image data with a first threshold which is higher than a lower limit input value and lower than an upper limit input image data value;
  comparing a maximum value of the inputted image data with a second threshold which is higher than the first threshold and lower than the upper limit input image data value;
  adopting the minimum value of the inputted image data as a minimum input value if the minimum value of the inputted image data is not higher than the first threshold;
  adopting the lower limit input image data value as the minimum input value if the minimum value of the inputted image data is higher than the first threshold;
  adopting the maximum value of the inputted image data as a maximum input value if the maximum value of the inputted image data is not lower than the second threshold;

adopting the upper limit input image data value as the maximum input value if the maximum value of the inputted image data is lower than the second threshold; and correcting the inputted image data so that inputted image data within a range between the minimum input value and the maximum input value thus determined correspond to data within a range between the lower limit value and the upper limit value for input to the image outputting means, to prepare image data to be applied to the image outputting means.

6. A process as set forth in claim 5, wherein the first threshold is set at a value which is higher than a data value corresponding to a background portion of a character document original and lower than a minimum data value of a gray-scale image.

7. A process as set forth in claim 5, wherein the second threshold is set at a value which is lower than a data value corresponding to a character portion of a character document original and higher than a maximum-data value of a gray-scale image.

8. An image outputting apparatus for outputting an image on the basis of inputted image data having values within a range between a lower limit value and an upper limit value, the image outputting apparatus comprising:
  image outputting means capable of producing pixels of a plurality of density gradation levels;
  first comparison means for comparing a minimum value of the inputted image data with a first threshold which is higher than a lower limit input image data value and lower than an upper limit input image data value;
  second comparison means for comparing a maximum value of the inputted image data with a second threshold which is higher than the first threshold and lower than the upper limit input image data value;
  minimum input value determining means for adopting the minimum value of the inputted image data as a minimum input value if the minimum value of the inputted image data is not higher than the first threshold, and adopting the lower limit input image data value as the minimum input value if the minimum value of the inputted image data is higher than the first threshold, on the basis of the comparison by the first comparison means;
  maximum input value determining means for adopting the maximum value of the inputted image data as a maximum input value if the maximum value of the inputted image data is not lower than the second threshold, and adopting the upper limit input image data value as the maximum input value if the maximum value of the inputted image data is lower than the second threshold, on the basis of the comparison by the second comparison means; and
  data correction means for correcting the inputted image data so that inputted image data within a range between the minimum input value and the maximum input value thus determined correspond to data within a range between the lower limit value and the upper limit value for input to the image outputting means, to prepare image data to be applied to the image outputting means.

9. An image outputting apparatus as set forth in claim 8, wherein the first threshold is set at a value which is higher than a data value corresponding to a background portion of a character document original and lower than a minimum data value of a gray-scale image.

10. An image outputting apparatus as set forth in claim 8, wherein the second threshold is set at a value which is lower than a data value corresponding to a character portion of a character document original and higher than a maximum data value of a gray-scale image.

11. An image outputting apparatus as set forth in claim 8, wherein the image outputting means includes:

a photoreceptor;

exposure means for selectively exposing the photoreceptor to light to form an electrostatic latent image corresponding to the applied image data on a surface of the photoreceptor;

a developing unit for developing the electrostatic latent image formed on the surface of the photoreceptor into a toner image; and transfer means for transferring the toner image onto a sheet.

\* \* \* \* \*